July 23, 1940.  E. O. SCHJOLIN  2,209,285
METAL BODY
Filed Sept. 18, 1935   9 Sheets-Sheet 3
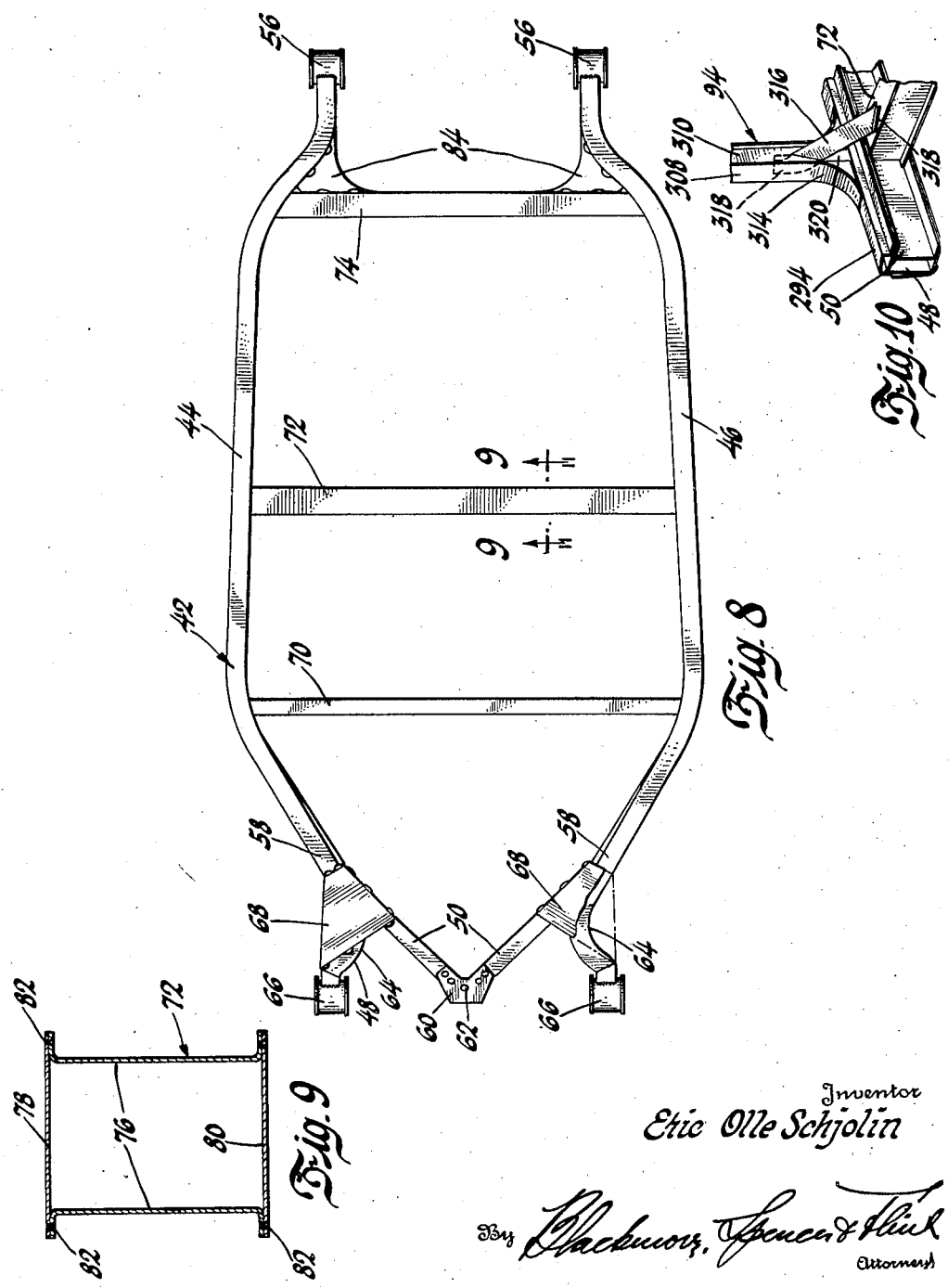

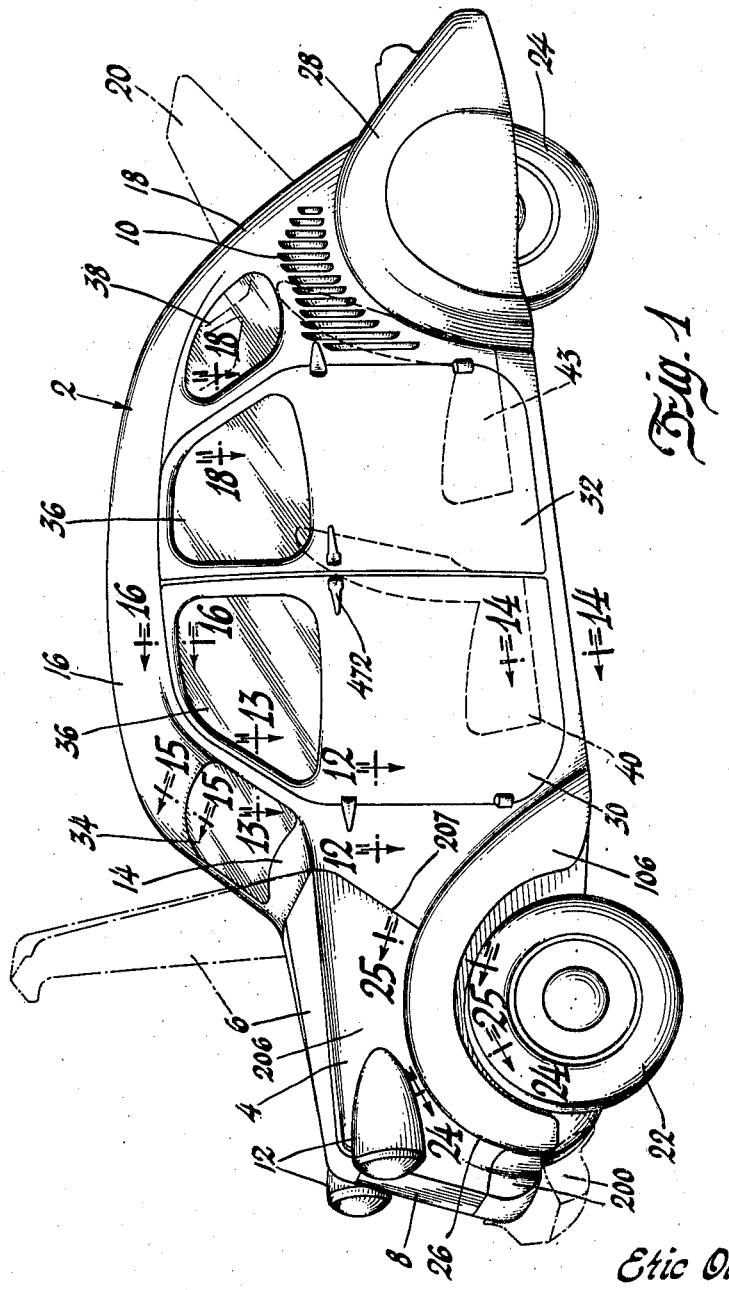

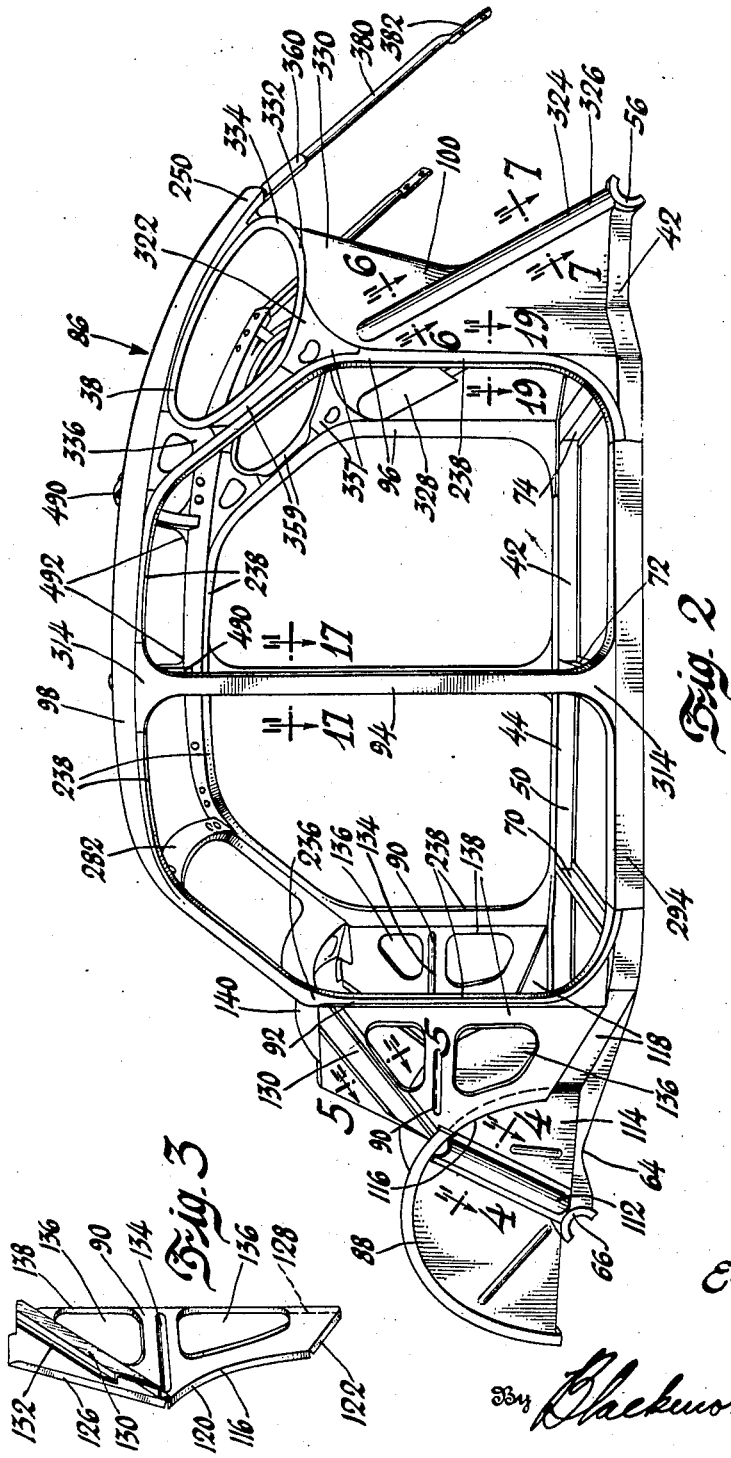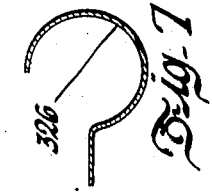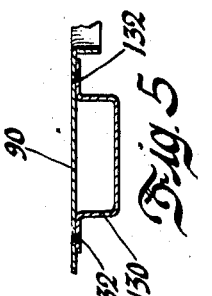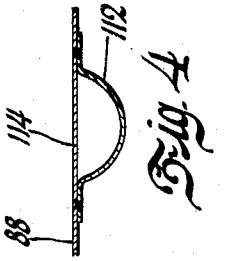

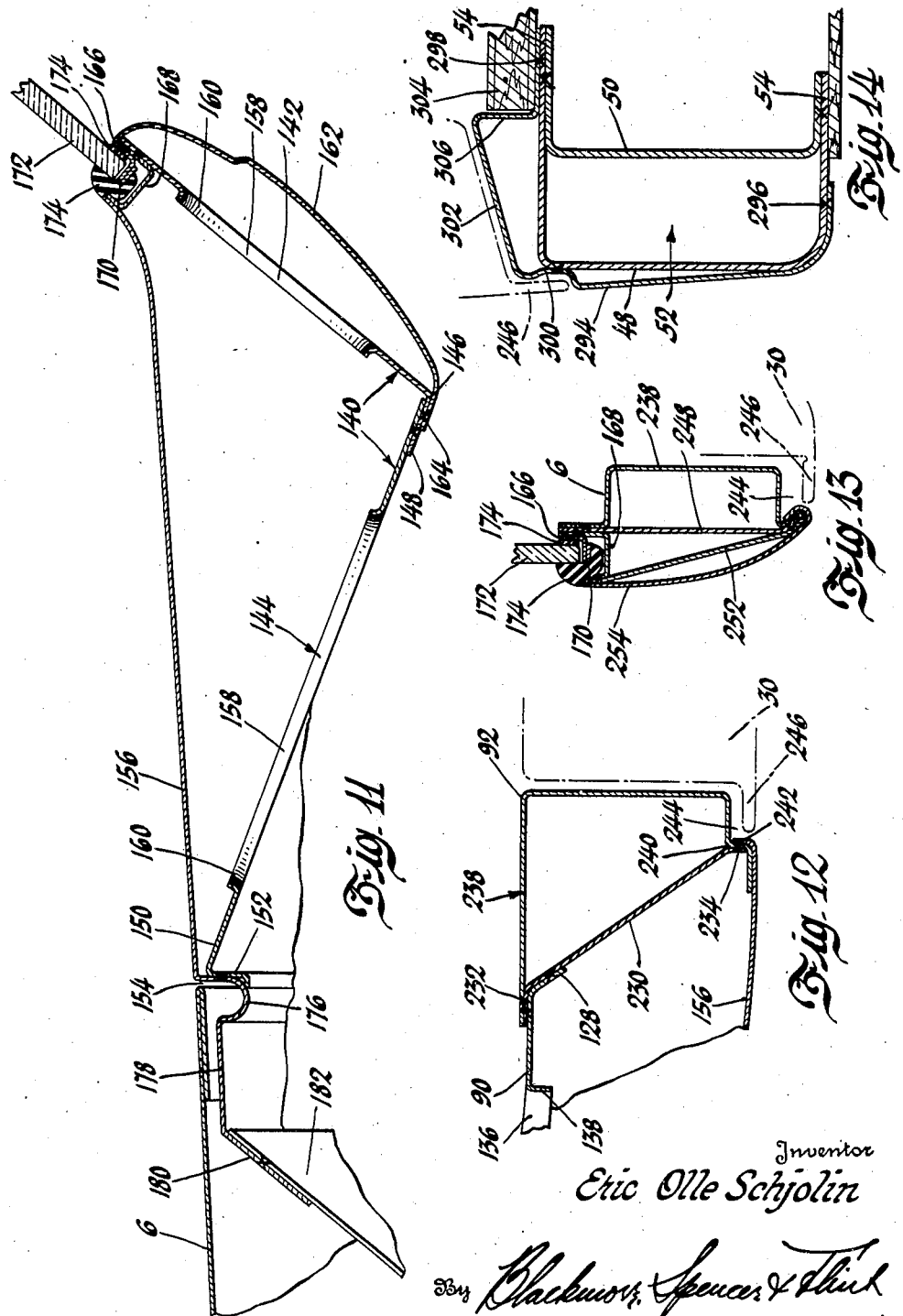

July 23, 1940.   E. O. SCHJOLIN   2,209,285
METAL BODY
Filed Sept. 18, 1935   9 Sheets-Sheet 5

Inventor
Eric Olle Schjolin
By Blackmore, Spencer & Hurd
Attorneys

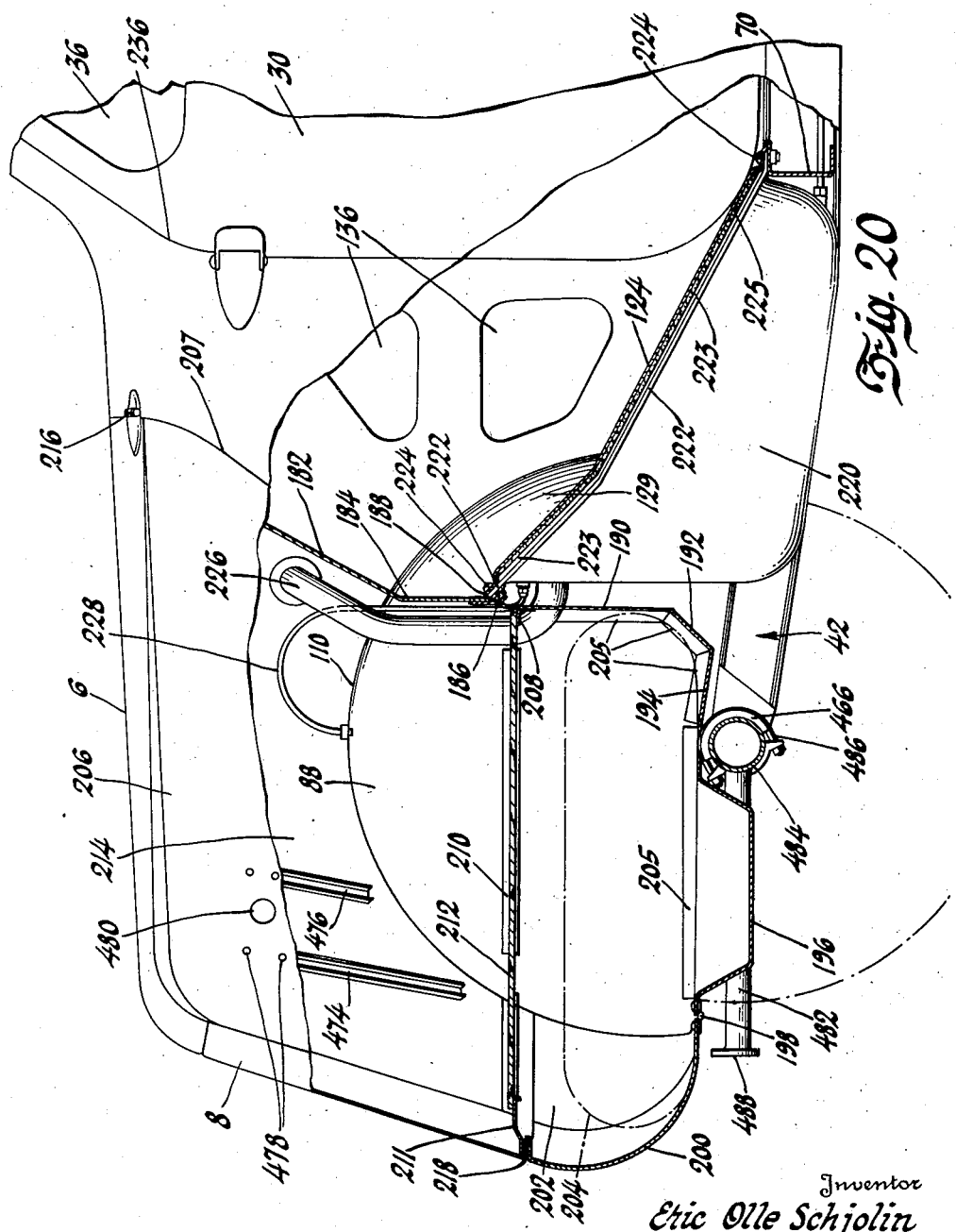

July 23, 1940.   E. O. SCHJOLIN   2,209,285
METAL BODY
Filed Sept. 18, 1935    9 Sheets-Sheet 7
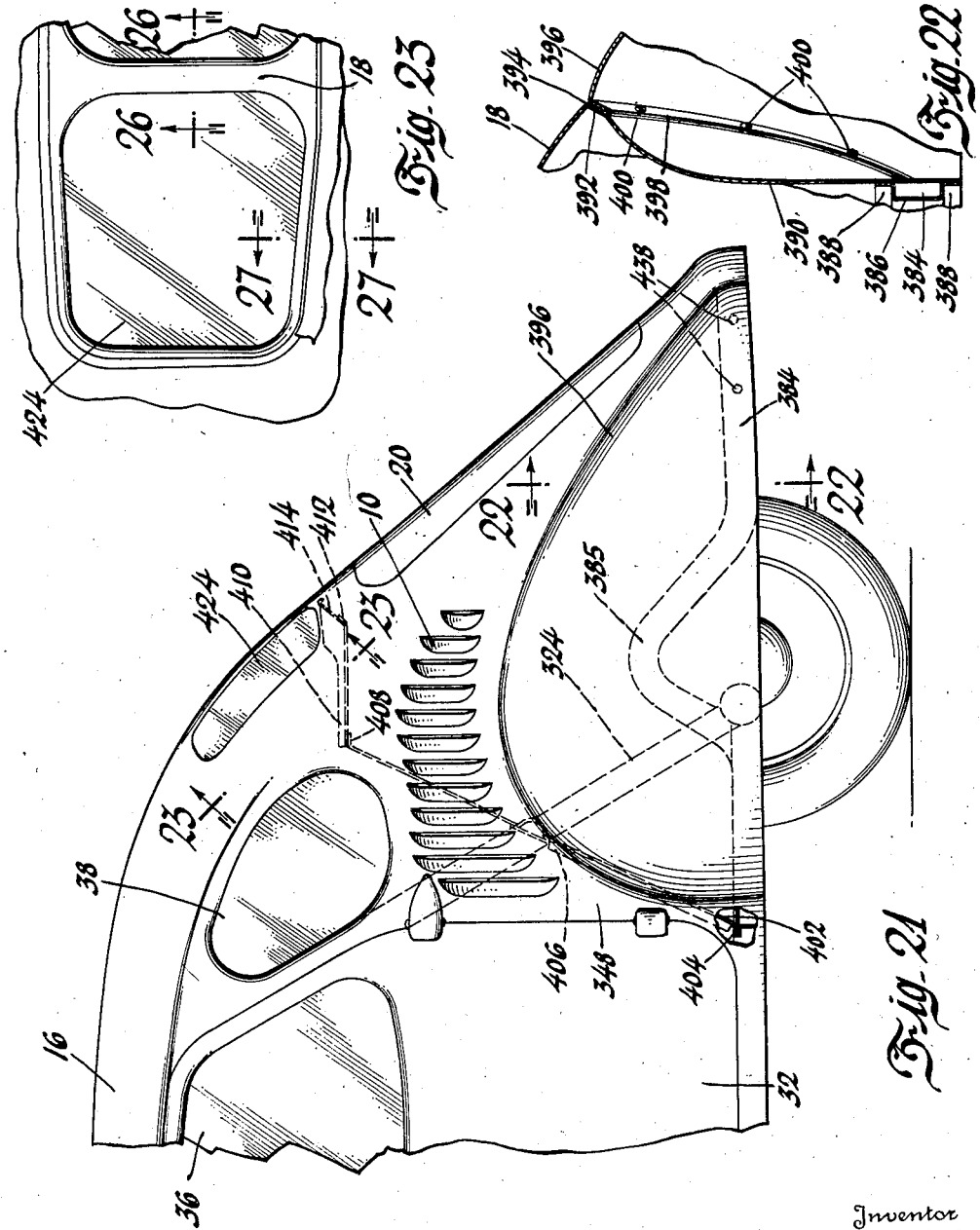
Inventor
Eric Olle Schjolin
By Blackmore, Sewers & Flint
Attorneys July 23, 1940.  E. O. SCHJOLIN  2,209,285
METAL BODY
Filed Sept. 18, 1935   9 Sheets-Sheet 8

Inventor.
Eric Olle Schjolin
By Blackmore, Spencer & Flint
Attorneys

July 23, 1940. E. O. SCHJOLIN 2,209,285
METAL BODY
Filed Sept. 18, 1935 9 Sheets-Sheet 9

Inventor
Eric Olle Schjolin
By Blackmore, Spencer & Flint
Attorneys

Patented July 23, 1940

2,209,285

UNITED STATES PATENT OFFICE 2,209,285

METAL BODY

Eric Olle Schjolin, Pontiac, Mich., assignor to General Motors Corporation, Detroit, Mich., a corporation of Delaware Application September 18, 1935, Serial No. 41,062

28 Claims. (Cl. 296—28)

This invention relates to automobile bodies and particularly to a metal body in which the ordinary chassis used on automotive vehicles is eliminated and the purpose of the usual structure thereof is fulfilled by the structure of the body.

The object of the invention is to construct a vehicle which is much lighter than present day vehicles of the same size and which can be operated at much less cost. The vehicle being lighter, it is less expensive to manufacture.

A further object of the invention is to utilize the space back of the rear seat for the engine and use the front part of the vehicle where the engine is ordinarily placed as a receptacle for the spare tire, the tools, baggage, etc.

It is also an object of the invention to construct a four door vehicle in which the front and rear doors on one side are interchangeable with the rear and front doors, respectively, on the opposite side so that it is necessary to construct doors of but two different types.

Further objects of the invention reside in the specific details of construction which will be enumerated in the description.

On the drawings

Figure 1 is a perspective view of the vehicle as a whole, showing the front portion of the hood and the rear deck cover in dotted lines in raised position.

Figure 2 is a view of the skeleton frame of the vehicle with the outer skin, the hood, and rear deck removed.

Figure 3 is a perspective view of the cowl brace.

Figures 4–7 inclusive are sectional views on the corresponding lines of Figure 2.

Figure 8 is a plan view of the underframe of the body.

Figure 9 is a section on the line 9—9 of Figure 8.

Figure 10 is a perspective view of the connection between the center door pillar and the underframe.

Figure 11 is a sectional view through the lower portion of the windshield, the cowl, and the rear portion of the hood.

Figures 12–16 inclusive and 18 are sectional views on the corresponding lines of Figure 1.

Figure 17:
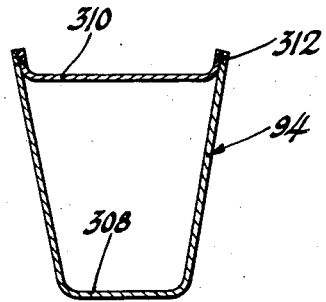
Figure 19:
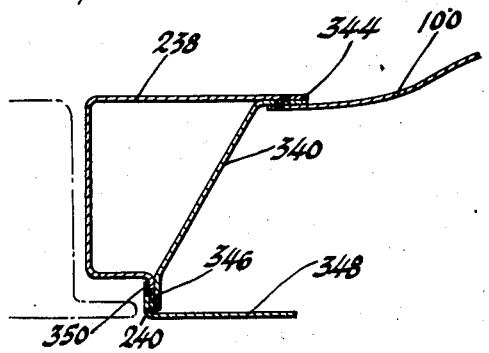

Figures 17 and 19 are sectional views on the lines 17—17 and 19—19 of Figure 2.

Figure 20 is an enlarged sectional view of the front portion of the vehicle with parts broken away and shown in section.

Figure 21 is an enlarged detailed view of the rear end of the vehicle with parts broken away and shown in section.

Figure 22 is a sectional view on the line 22—22 of Figure 21.

Figure 23 is a view of the rear window looking from the inside taken substantially in the direction of the line 23—23 of Figure 21.

Figure 24:
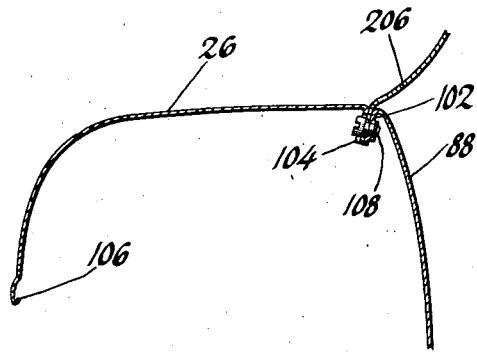
Figure 25:
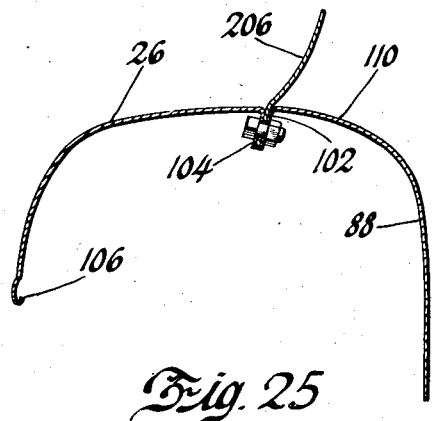

Figures 24 and 25 are sectional views on the corresponding lines of Figure 1.

Figure 26:
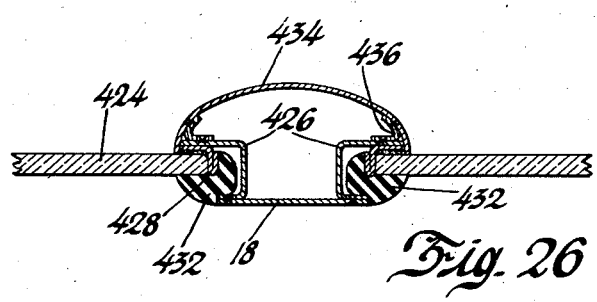
Figure 27:
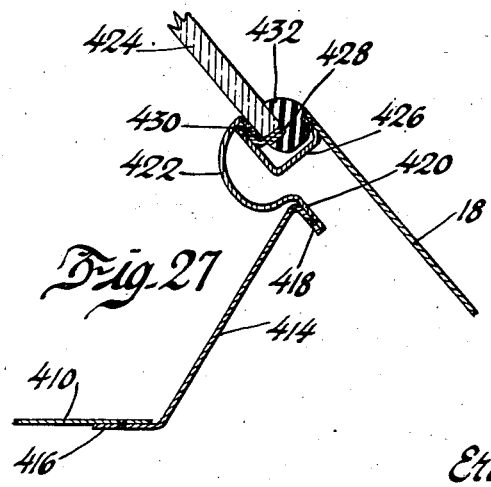

Figures 26 and 27 are sectional views on the corresponding lines of Figure 23.

Figure 28:
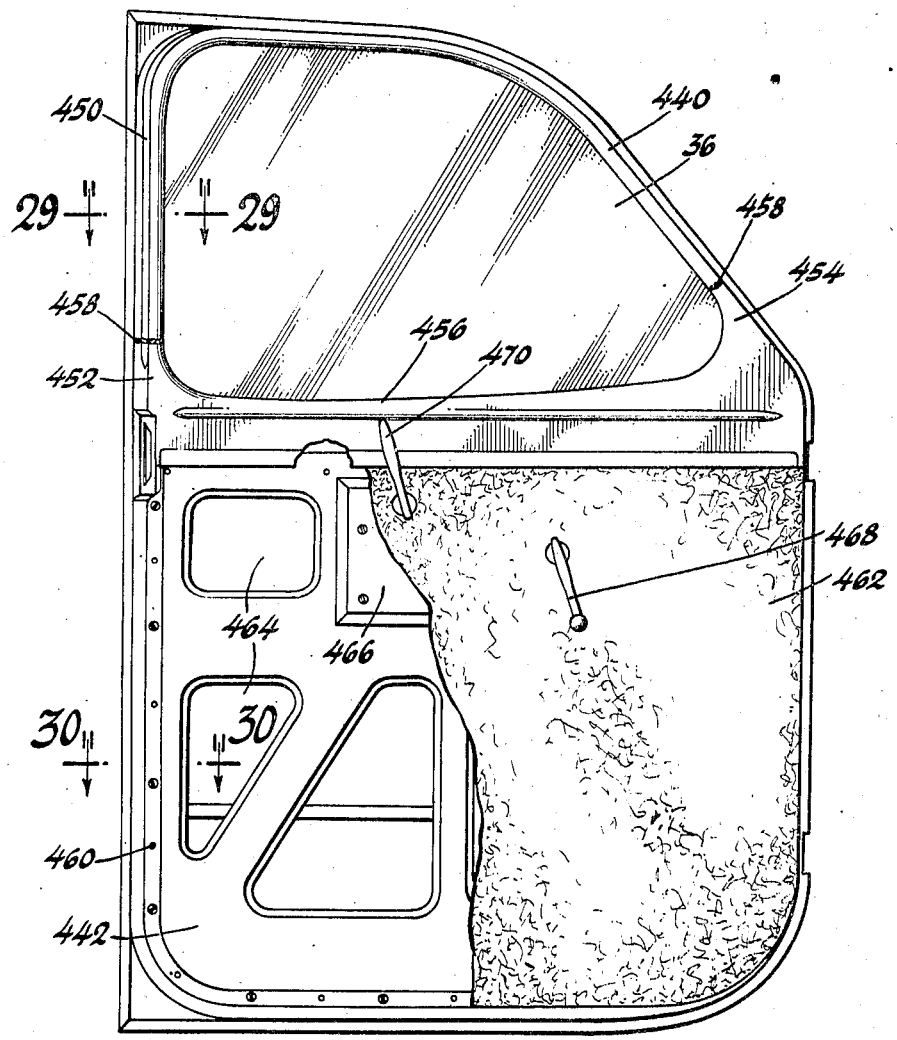

Figure 28 is a view of the door looking from the back with a portion of the cardboard panel broken away to show the interior structure of the door.

Figure 29:
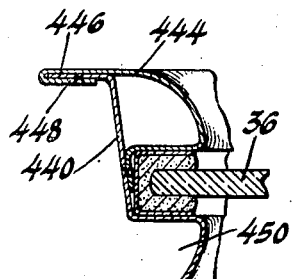
Figure 30:
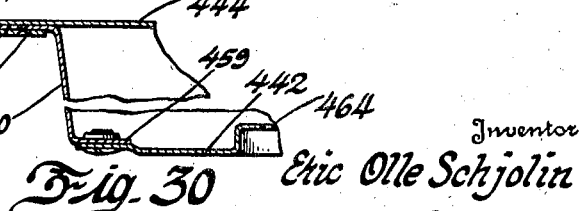

Figures 29 and 30 are views on the corresponding lines of Figure 28.

Referring to the drawings, the numeral 2 indicates the body as a whole. The body has the hood 4, the hinged cover 6, the cover being hinged at its rear and adjacent the windshield to open upwardly in the manner indicated by the dotted line portion in Figure 1. The front 8 of the hood is solid and the usual grille is not used for the reason that the engine is positioned at the rear of the vehicle, the air-inlet louvers 10 being applied to the vehicle side over the rear fender. The headlamps are indicated at 12, the cowl at 14. 16 designates the top and 18 the rear deck having a door 20 shown in dotted outline in Figure 1 which is hinged at its end portion and swings upwardly. The front wheels are indicated at 22 and the rear wheels at 24. The front wheels are enclosed by the front fenders 26 and the rear wheels by the rear fenders 28. The front door is indicated at 30, the rear door at 32 and the windshield at 34. Each door has the glass 36 at its upper portion, the glass being slidable in the door in the usual way. An oval window 38 is provided at the rear of the vehicle to the rear of the rear door and over the louvers 10 of the engine. The front seat is indicated at 40 and the rear seat at 43. The arrangement of the parts so far described is in general conventional, and per se forms no part of the invention.

Referring to Figs. 8, 9, 10, and 14, the underframe of the vehicle is indicated as a whole at 42 and comprises the two side members 44 and 46. Each side member comprises the outer channel 48 and the inner channel 50 which are nested and are secured together in the manner best shown in Figures 10 and 14 to form a box section indicated at 52. The side flanges of the two channels 48 and 50 overlap at 54 and are secured together by welding. These two channels extend the length of the vehicle and at the rear terminate in the half bearings 56 which are adapted to fit over the rear axle to which the frame is rigidly secured.

At the front the rear channels 50 leave the outer channels at the points indicated at 58 and converge and are united by the upper and lower gusset plates 60 which have openings 62 for the reception of a U bolt which passes around the front axle rigidly to secure the front end of the channels 50 in position. The front ends of the outer channels 48 are curved at the front as indicated at 64 and have their front ends terminating in the half bearings 66 by means of which they are rigidly secured to the front axle of the vehicle. Suitable gusset plates 68 are secured to the channels 48 and 50 at their front ends where the curves 64 are formed in the outer channels 48. The purpose of the curves 64 is to accommodate the independent springing unit of the front wheels. It has been found that when the wheels are turned the housing containing the coil spring of the independent springing unit will strike the frame 42 and prevent steering unless the curves 64 are provided.

The frame has the front transverse strengthening channel bar 70, the middle box-shaped strengthening bar 72, and the rear box-shaped transverse strengthening bar 74. The structure of the bars 72 and 74 is best shown in Figure 9. Each bar comprises the side channel irons 76 which have their channels facing in opposite directions. To the top and bottom of these channels there are secured the plates 78 and 80, the structure being welded as indicated at 82. To further strengthen the frame the rear transverse bar 74 is united by means of gusset plates 84 to the side bars 44 and 46 of the frame.

Referring to Figure 2 and the views indicated by the sectional lines shown thereon, it will be seen that the frame 42 has mounted thereon a skeleton frame indicated as a whole at 86. The frame comprises the front inner wheel housing members 88, the cowl braces 90, front door pillars 92, center pillars 94, rear pillars 96, the roof beams 98 and the rear reinforcing and supporting plates 100.

The front wheel housing plate 88 is curved as shown in Figure 2 and is shown in section in Figures 24 and 25. It has an upper downwardly turned flange 102 by means of which it is connected to a flange 104 on the front fender 26, machine screws 108 being used to form the connection. The outer side of the fender is downturned and has the return bent strengthening flange 106. The top of the pan 88 is shallow at the front portion thereof as shown in Figure 24, but gradually widens out and is deeper at the rear as shown by the numeral 110 in Figure 25. The portion at 110 forms part of the housing for the front wheels 22.

The pan 88 extends to and is united by welding to a box-shaped reinforcement 112, the upper end of which extends outwardly to the edge of the portion 110. The box-shaped member 112 is also joined to a pan 114 and the three parts 88, 112, 114 are united by welding as shown in Figure 4. The upper foremost portion of the pan 114 is rounded on an arc parallel with and inwardly spaced from the arc indicated at 116 on the cowl brace 90, and its lower portion 118 narrows into a neck which extends downwardly over the frame 42 and is secured thereto by welding. The lower portion of the front pan 88 is not secured to the frame 42 to allow an easy replacement, while the lower portion of the pan 114 below the arc is likewise not secured to the adjacent parts of the frame.

The cowl brace 90 has an arc corresponding to the arc 116 and is secured to the pan 88 by means of a flange 120 along the upper part of the arc 116. The end of the cowl brace 90 has a flange 122 which is secured to the toe board 124 (Figure 20) of the vehicle. The edge of the cowl brace above the arc 116 has a strengthening flange 126, and a similar strengthening flange 128 is at the rear of the brace to serve as a means of securing the brace to the front door pillar 92. A basin-shaped member 129 (Figure 20), conforming to the shape of the rear portion of wheel housing, has edge flanges which are secured to the pan 114, the rear edge of part 110 of the pan 88, and to the flange 120 along the arc 116. The rear edge of part 129 is secured to the floor board 124.

A box-sectioned reinforcing member 130 is secured at an angle to the cowl brace 90. The member 130 has the flanges 132 by means of which it is welded to the cowl brace 90. It will be noted that the lower end of the reinforcing box section 130 begins where the box section brace 112 ends so that there is a continuous bracing from the half bearing 66 to the lower end of the windshield. A suitable strengthening rib 134 is provided at the center of the cowl brace 90 and suitable lightening openings 136 are provided, the openings having the marginal strengthening flanges 138.

Across the tops of the cowl braces 90 and beneath the windshield there is secured the transverse strengthening member or bar 140. The shape of this member is best seen by referring to Figure 11. The member 140 is comprised of the two elements 142 and 144, the element 142 being inclined adjacent the instrument board and extending from the bottom of the windshield downwardly and forwardly to a line at 146 where it has the flange 148 which is united by welding to the rear end of the member 144. The member 144 extends forwardly and upwardly and ends at the place indicated at 150 where it is provided with a flange 152 which is welded to a corresponding flange 154 on the outer skin 156 of the cowl. Both the members 142 and 144 are provided with the lightening openings 158, and suitable strengthening flanges 160 are provided at the edges of the openings. A bowed strengthening channel 162 extends across the vehicle and is secured to the front door pillars. It has a bottom flange 164 secured by welding to the flange 148, and at its top it has a short flange 166 which is secured by welding to the channel 168 which forms the bottom of the windshield and which is welded at one side to the panel 142 and at the other side to the end of the cowl skin or cover 156. An angle member 170 forms a continuation of the flange 166 and is welded to the inside of the channel 168 to receive the glass 172 of the windshield. Suitable rubber or other packing 174 in the channel 168 forms a weather-tight joint with the glass 172.

The outer skin 156 of the cowl has a rain channel 176 formed therein at its forward edge at the flange 154 and beyond the channel 176 the metal extends forwardly as indicated at 178 and then is flanged downwardly as at 180 where it is welded to a cowl pan 182. The part 178 forms the seat to receive the overlap portion of the hinged side of the door 6. The cowl pan 182 is inclined for a portion of its length (see Figure 20) and then is downturned into the vertical panel portion 184 which has an inturned inclined flange 186 on the end thereof suitably secured to the flange 188 at the upper edge of the toe board 124.

A panel 190 is secured to the edge of the panel portion 184 and extends downwardly toward the frame 42 and has an inclined portion 192 extending forwardly, and a portion 194 extending toward the front of the vehicle. In front of the portion 194 there is a recessed pan 196 which forms a box for the reception of tools. At the front of the box 196 there is the hinge 198 to pivot the door 200 at the lower front end of the cowl. The door 200 gives access to a receptacle 202 at the bottom portion of the cowl and in this receptacle there is received a spare tire or wheel indicated in dotted lines at 204. The parts 190, 192, 194 and 196 have edge flanges 205 welded to the pan 88 but they are not welded to the frame.

The cowl has the rigid side panels 206, the bottom ends of which are secured at the joint formed between the pan 88 and the fender 106 as shown in Figures 24 and 25. The rear edges of the panels are rigidly secured as by screws to the cowl along the lines 207. These panels extend forwardly and the forward portion thereof forms the rigid closed portion 8 at the front of the vehicle. Both panels 206 at the sides of the cowl and the front portion 8 are preferably formed of one piece.

Angle irons 208, 210, and 211 are secured to the inside of the cowl panels 206 and the panel 190 and form the support for a removable floor 212 which forms the bottom of the compartment 214, access to which is had through the door 6, the hinges of which are shown at 216. Preferably the front portion 8 has an inturned flange 218 at its bottom which is secured to the angle iron 211.

Referring to Figure 20, the fuel tank is indicated at 220 and is beneath the toe board 124. The tank has the peripheral flange 222 at its top by means of which it is secured at its front end to the flange 186 of the cowl pan 182 and at its rear end to the channel 70 of the frame. The tank top or cover is indicated at 223. Suitable fastening means 224 secure both the toe board 124 and the tank 220 to the channel 70. Preferably an asbestos sheet 225 is placed between the toe board and the tank.

The tank 220 has a suitable filler spout 226 which leads upwardly into the compartment 214 and outwardly at one side of the vehicle. A suitable ventilating pipe 228 is also secured at the upper portion of the tank 220 and extends upwardly and is secured to the portion 118 of the wheel housing panel 88 and is open to the atmosphere inside the wheel housing.

Referring again to Figure 2, the rear edge of the cowl brace 90 is secured by means of the flange 128 to the front door pillar 92 as is best shown in Figure 12. The front door pillar comprises the upright panel or strip 230 the lower end of which has a foot (not shown) which is secured to the frame 42. The strip 230 has the flange 232 at one side and the flange 234 at the other, the flange 232 being secured by welding to the cowl brace 90. The member 230 extends from the underframe upwardly to substantially the point 236 or where the front door commences to incline rearwardly. The second member of the front door pillar comprises the channel 238 the edge of the inside portion of which is welded to the flange 232 of the strip 230 and the outer edge of which has the flange 240 welded to the flange 234 of the strip 230. The outer shell or skin 156 has the inturned flange 242 which is in turn welded to the flange 240 on the channel 238. A suitable rabbet 244 is formed to allow for the overlap 246 of the door 38. The channels 238 extend upwardly the full length of the front door pillar along both the straight portion and the inclined portion. They also extend across the tops of both doors and down the rear door pillar as is indicated by the numeral 238 in Figures 16, 18 and 19. The channels 238 form a part of the top beams 98 and a part of the rear door pillar. The cross-sectional shape of the channels 238 will change somewhat depending upon the particular connection or joint to be made by the flanges thereof.

At the point 236 (Figures 1 and 2) where the strip 230 ends a second strip 248 commences and is secured to the strip 230. This strip 248 extends along the inclined part of the front door pillar and across the top of both doors and rearwardly and ends at the point indicated at 250 or the end of the beam 98 of the top. The manner in which parts 238 and 248 are joined and interrelated is best shown in Figure 16.

Referring to Figure 13, an additional reinforcing member 252 is used. This member extends at the side of the windshield opening and reinforces the windshield frame and the front door pillars. Over the strip 252 the outer shell or skin 254 is applied. The parts 238, 248, 252, and 254 are secured together as by welding as indicated in Figure 13.

Figure 16:
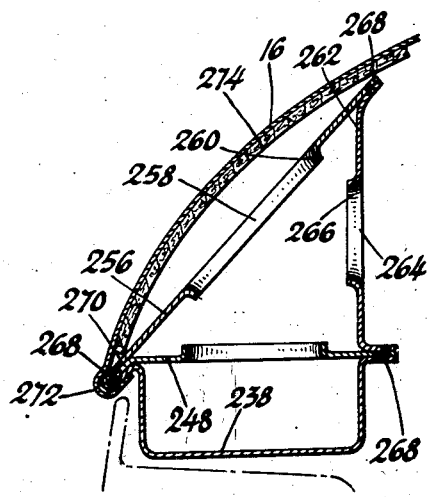

Referring to Figure 16, at the top of the windshield the strip or panel 256 is joined to the strip 252 at the corner of the windshield and extends rearwardly the length of the vehicle and terminates at 250 to form the upper portion of the beam 98 of the roof. This member 256 is inclined as shown in Figure 16 and is provided with lightening openings 258 provided with flanges 260 which strengthen the construction. Interiorly of the vehicle a panel 262 commences at the windshield and runs rearwardly to a point 250 or the entire length of the roof beam 98. This member is also provided with suitable openings 264 and has suitable strengthening flanges 266.

Each of the members 248, 256, and 262 has edge flanges secured together by welding as indicated at 268. The channel members 238 are also welded to the bottom of the box structure formed by these three members 248, 256, and 262.

Referring to the left side portion of Figure 16, it will be noted that the flanges at the edges of members 238, 248, and 256 form a projecting portion 270, and over this projecting portion there is turned the edge portion or flange 272 of the roof 16. By setting the metal roof 16 on the frame and turning in the edge flanges 272 as shown, an exceptional tightly stretched and weatherproof roof is obtained. Suitable sound deadening material 274 is suitably secured to the inside of the roof.

Figure 15:
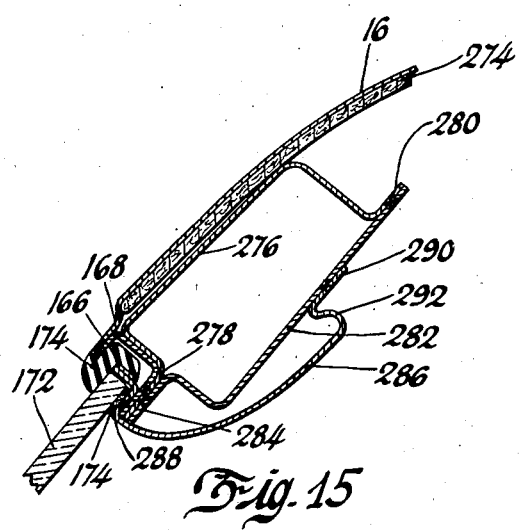

Referring to Figure 15, the structure at the top of the windshield is shown. A channel member 276 has a flange 278 which is suitably welded to the channel 168 which holds the glass 172. The opposite edge of the channel 276 has a flange 280 which is welded to one edge of angle member 282 which closes the channel 276 and forms a box section. The other end of the angle iron 282 has a flange 284 which is welded to the flange 278 of the channel 276. A suitable finish strip 286 has a short flange 288 which projects in behind the flanges 27 and 284 where it is welded in place. The other edge has the flange 290 welded to the angle member 282. A suitable recess 292 is formed at the finish strip 286, the purpose of which is to receive the ends of the upholstery which finishes the interior of the roof.

Referring to Figures 2 and 14, the bottom of both doors is finished by means of the outer finish skin or shell 294, the cross sectional shape of which is best indicated in Figure 14. The shell portion 294 is welded at its lower portion 296 to the channel 48 and at its upper portion at 298 to the upper flange of the channel 48. The member 294 is provided with the rabbet 300 to receive the overlap 246 of the door. The threshold portion 302 is inclined as shown to form a jamb face against which the door will strike. The edge of the floor boards 304 rest on the flange 54 and abut against the vertical portion 306.

Referring to Figures 2, 10 and 17, the structure of the center door pillar 94 is shown. The pillar comprises the upright channel column 308 and the inner filler plate or channel 310 which closes the channel 308 to form a box section. The channel 310 is united to the channel 308 at their edges by welding the flanges together as shown at 312.

Both the upper and lower portions of the door post 94 are curved and spread out as best shown at 314 in Figures 2 and 10 so that the post forms an elongated I. At its upper portion the part 314 is secured to the channel member 238 as by welding and at its lower portion the post is secured to the shell member 294 covering the outer portion of the frame. The post is secured by welding.

Referring to Figure 10, at the lower portion of the door an iron 316 V-shaped in cross section is welded to the transverse member 72 by the flanges 318. At its upper portion the V is split and the sides 318 welded to the insides of the channel 308 of the post 94. This construction forms a very rigid structure of the lower portion of the door. At the iron 316 the closure channel 310 is slotted as indicated at 320 to accommodate the iron 316.

Referring to Figure 2, at the rear door pillar 96 there is secured the reinforcing and strengthening plate or panel 100. It is secured to the post by spot welding entirely along its forward edge (Figure 19) and at its upper portion it curves on the arc 322 away from the door post and toward the oval window 38 at the rear of the vehicle. The lower portion of the panel 100 is shaped to conform to the shape of the frame 42 to which it is secured. The rear edge of the plate 100 is inclined at its lower portion as shown at 324 and this inclined portion as rounded as shown at 326 in Figure 7, the purpose of the rounded portion being to give additional strength to the plate and to the edge. The rounded portion begins at the half-bearing 56 and extends beyond the edge and into the plate proper as shown by the section line 6—6. Where the rounded portion extends into the plate 100 it is closed by flat plate 328 to form a box section and give additional strength to the vehicle at the rear.

The upper portion 330 of the plate 100 is inturned and has its upper edge 332 secured to the lower portion of the frame 334 of the rear window 38. Between the frame 334 of the oval window 38 and the inclined portion of the rear door pillar 96 a filler and strengthening plates 336 and 337 are applied. These plates are of a suitable shape so that they contact with all of the adjacent parts and are welded thereto.

Figure 18:
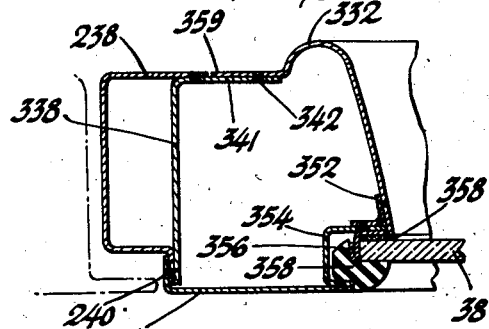

Referring to Figures 18 and 19 the rear door pillar is reinforced and strengthened by means of a strip 338 which commences at the top of the pillar where it meets the beam 98 and extends substantially to the arc 322. At this point it is welded onto a second reinforcing strip 340 which extends to the bottom of the door post and is secured to the frame 42. The angle reinforcement 338 in Figure 18 has a flange 341 which is spot welded at 342 to the frame 332 of the window 38 and to both flanges of the channel 238. The reinforcing strip 340 has flanges 344 and 346 at its inner and outer edges respectively. The flange 344 is welded to the plate 100 and to the channel 238 while the flange 346 is welded to the outer flange 240 of the channel 238. The outer shell or skin 348 at the rear of the vehicle is suitably welded to the flange 240 by means of flange 350.

The frame 332 of the oval window has secured thereto on the inner periphery thereof the angle member 352 which in turn has welded thereto the channel 354. To the channel 354 there is welded the angle strip 356 in which the window 38 is mounted. Suitable rubber or other weather-tight packing 358 holds the window in place and prevents rattle. In order to remove the window it is only necessary to withdraw the outer packing 358 which will allow the window to be pushed from its retaining angle 356.

The frame 332, where it is adjacent the inclined portion of the rear door pillar, has a broader portion 359 which extends to the flange on the channel 238. See Figures 2 and 18.

The rear ends of the beams 298 have a shape which is similar to the cross sectional shape of the three elements 248, 256, 262 shown in Figure 16. In each end there is inserted the fixture 360 which has its free end formed to circular shape and suitably slotted to receive the end of the tube 380 which forms a continuation of the beam 98. The tube has its end 382 flattened and punched to receive bolts or rivets. This end 382 is secured to the top of the member 390 of the rear wheel housing. The parts 98, 360, and 380 are suitably interconnected by welding.

Referring to Figures 21 and 22, the rear end of the vehicle at the bottom beyond the end of the frame 42 has a box section 384 formed thereon to form a continuation of the side members of the frame and to strengthen the structure at the bottom. The box section 384 is formed by the channel 386 having the flanges 388 at its sides. These flanges are welded to the inner wheel housing member 390 which is bowed as best shown in Figure 22. The upper portion of the inner wheel housing member 390 has a flange 392 which is welded to downturned flange 394 on the outer shell or skin which forms the rear deck 18 of the vehicle. The outer wheel housing member 396 has a downturned flange 398 which corresponds to the flanges 392, 394 and all the flanges have the screws 400 passing therethrough to secure the parts together. The box section portion 384 is preferably shaped as shown in the dotted outline in Figure 21, the arch shown at 385 arching over the line intersecting the centers of the rear wheels. A transverse pan (not shown) connects the box-sectioned members 384 to close the bottom of the vehicle. This pan is preferably louvered to allow the escape of air from the engine compartment.

Inside the vehicle and to the rear of the rear door 32 an inclined plate 402 is welded by the flange 404 to the transverse member 74 and at its sides it is suitably secured as by means of the flanges 406 to the adjacent structure inside the vehicle. This plate 402 forms a support for the back of the rear seat.

At its upper portion the plate 402 has the rearwardly turned flange 408 to which there is welded the plate 410 which forms a shelf or platform at the rear of the rear seat. The plate 410 is not secured at its sides to the vehicle but is spaced therefrom and does not extend all the way to the rear of the vehicle but ends on a line indicated by 412. At this point it is joined onto an upwardly and rearwardly inclined reinforcing plate 414 (Figure 27) having a flange 416 at its lower end which is welded to the end of the platform 410. At its upper edge the plate 414 has the flange 418 which is welded to the edge flange 420 of the window frame 422 of the rear window 424. The outer shell or skin portion of the rear deck 18 has welded thereto the window channel 426 and to the channel there is welded the window receiving angle 428. A flange 430 on the frame member 42 is welded to the angle 428. The window 424 is received on the angle 428 and the rubber packing strip 432 squeezed into the space between the channel and the angle 428 to hold the window 424 in place. The window may be removed by removing the packing strip 432.

The rear window 424 is divided by the frame member 434 which cooperates with the window frame member 422 around the window. Suitable angle strips 436 are secured as by welding to the inside of the strip 434 and to the channel strips 426 of the windows. The rear deck 18 at the window 424 has no reinforcing other than the window frame as shown in Figures 26 and 27.

In Figure 21 the openings 438 shown in dotted lines which are formed in the box section 384 are for the purpose of attaching rearwardly extending arms to which the rear bumpers are attached.

The doors of the vehicle are shown in Figures 28, 29, and 30. The door in question is either the door on the left front side or the rear door on the opposite side, the front door on one side being interchangeable with the rear door on the other. The door in question is formed of three main metal members. One of the metal parts is indicated at 440 and comprises the edge frame member of the door which extends entirely around the door and at the top of the door also forms the inside portion of the window frame as shown in Figure 29. The second portion of the door forms the lower inside part as indicated at 442; the third portion of the door forms the outer panel and is indicated at 444. The edge portion 440 has the flange 446 at its outer portion which is adapted to receive the turned over flange 448 of the outer cover 444. The inner edge of part 440 has formed at its top a channel as indicated at 450, the channel forming a rain trough to shed rain and carry it to a point below the window 36. Below the window 36 the edge member 440 is straight as shown in Figure 30. The inside member 442 has the arms 452 and 454 which project a short distance above the lower edge 456 of the window and are welded at the lines indicated at 458 to the part 440 of the door. Below the window opening the inner member 442 is secured to the inner flange 459 of the part 440 as by welding or by use of screws or rivets.

Where the edge of the inner panel 442 overlaps with the panel 444 the structure is provided with a number of openings or depressions 460 which receive snap fasteners which secure the fiber-board or other paneling 462 in place. The panel 462 is used to cover the inside of the door and to add to the appearance of the door. The inner panel 442 is provided with suitable openings 464 to lighten the construction. The openings 464 are provided with edge strengthening flanges.

To the door is secured a suitable board 466 on which to mount the operating mechanism for the window, the handle of which is indicated at 468 and also to mount the latch operating mechanism for the door, the latch operating handle being indicated at 470.

Referring to Figure 1, the handle 472 for each door differs from the conventional handle in that it is mounted in a recess in the door and is pulled outwardly to operate the latch. The reason for this is that when the handle is mounted inside the door it decreases the wind resistance and has been found easier to operate for the reason that a direct pull is easier than a turn.

Referring to Figure 20, channel iron braces 474 and 476 are mounted on the inside of each side of the panels 206. The panels 206 and the braces 474 and 476 are provided with suitable openings 478 to receive fastening means to secure the headlamps 12 in place. An opening 480 between the braces 474 and 476 is to enable the insertion of electrical connections to the inside of the lamp housing to connect the electric bulbs and the horns inside the housing with the electrical system of the vehicle.

In Figure 20 a suitable forwardly extending bar 482 is secured to the front axle 484 by means of the U bolt 486 which fastens the front bearing 466 to the axle. This rod 482 has a head 488 at its outer end, the head serving as a means to mount the front fender.

The beams 98 of the roof are transversely braced by the channel irons 490, preferably two irons 490 being used. They are welded to the beams 490 at the widened flanges 492 at their ends.

Wherever practical and desirable the various elements such as 230, 248, 252 (Figures 12 and 13) 276, 282, 338, 340 (Figures 15, 18, 19) etc., are provided with lightening openings to reduce the weight.

I claim:

1. In a body for a wheeled vehicle, an underframe, means to attach the underframe directly to the axles of the vehicle, a skeleton frame secured to the underframe, said skeleton frame comprising a front wheel housing pan unsecured to the underframe, cowl braces secured to the underframe and to the wheel pans, front and rear door pillars and intermediate door pillars therebetween, and roof beams interconnecting the door pillars, said front door pillar secured to the cowl braces, and a reinforcing structure at the rear of the rear door pillars.

2. In a body for a wheeled vehicle, an underframe, means to attach the underframe directly to the axles of the vehicle, a skeleton frame secured to the underframe, said skeleton frame having a side comprising front, middle, and rear door pillars, said front and rear pillars including a channel member secured to the underframe at one end and extending up the front door pillar across the top of both front and rear door openings and then down the rear door pillar to the frame, said channel being secured to the frame at the base of the rear door pillar, and a top beam extending over the tops of the door openings and reinforcing the channel member.

3. In a body for a wheeled vehicle having an inclined windshield, an underframe, cowl plates secured directly to the underframe and extending from the underframe to the top of the cowl and for the full width thereof, and a channel reinforcing member secured to the side of each plate and extending substantially in a line with the side frame member of the windshield.

4. In a body for a wheeled vehicle having an inclined windshield, an underframe, cowl plates secured directly to the underframe and extending from the underframe to the top of the cowl and for the full width thereof, a channel reinforcing member secured to the side of each plate and extending substantially in a line with the side frame member of the windshield, and a transverse strengthening member joining the tops of the cowl plates and extending beneath the windshield.

5. In a body for a wheeled vehicle, said body having an exterior shell, an underframe, rear door pillars secured to the underframe, and vertical reinforcing plates secured at their lower edges to the frame and at their forward edges to the pillars and extending rearwardly inside the shell to reinforce the rear of the body, said plates having their rear edges formed into a channel to add rigidity thereto.

6. In a body for a wheeled vehicle, said body having an exterior shell, an underframe, rear door pillars secured to the underframe, vertical reinforcing plates secured at their lower edges to the frame and at their forward edges to the pillars and extending rearwardly inside the shell to reinforce the rear of the body, said plates having a rounded portion therein, and a strip over said rounded portion and secured to the plate to form a box structure therewith.

7. In a body for a wheeled vehicle, said body having an outer shell, an underframe, means to secure the underframe directly to the axle, a plurality of door pillars secured to the underframe, top beams extending longitudinally of the body and interconnecting the door pillars at the top, said beams extending rearwardly to a point substantially over the rear axle of the vehicle, said body extending well beyond the rear axle, reinforcing plates and window frames at the rear of the rearmost door pillar and inside the shell to reinforce the body at the rear, said plates and frames secured to the rear pillar, wheel housing plates forming a part of the body, and means extending between the ends of the top beams and the wheel housing plates and secured to both to reinforce the body.

8. In a body for a wheeled vehicle, an underframe comprising two spaced longitudinal members, each member comprising two nested channels with the channels facing in the same direction and secured to each other at their side flanges to form a box section, a front transverse channel member secured to both longitudinals, central and rear box-sectioned transverse members secured to both longitudinals, and means at the ends of the longitudinals to secure the frame directly to an axle.

9. In a body for a wheeled vehicle, an underframe comprising two spaced longitudinals, each longitudinal comprising two nested channels with the channels facing in the same direction and secured to each other at their side flanges to form a box section, one of said channels of each longitudinal diverging from the other at one end of the frame, the diverging channels meeting and being secured together, a front transverse channel member secured to both longitudinals, central and rear box-sectioned transverse members secured to both longitudinals, and means at the ends of the longitudinals to secure the frame directly to an axle.

10. In a body for a wheeled vehicle having a windshield, a transverse cowl bar extending across the vehicle at the top of the cowl, said bar comprising one member positioned in the plane of the windshield, and a second member secured to the first and extending from the bottom thereof upwardly to the forward end of the cowl.

11. In a body for a wheeled vehicle having a windshield, a transverse cowl bar extending across the vehicle at the top of the cowl, said bar comprising one member positioned in the plane of the windshield, a second member secured to the first and extending from the bottom thereof upwardly to the end of the cowl, and a bowed reinforcing member extending over and secured to said first member.

12. In a metal body for a wheeled vehicle, a top beam comprising two strips at right angles to each other and secured together, a third strip uniting the free ends of the first two and forming therewith a box section, a roof having its edge extending over and concealing the third strip, and a door pillar member secured to the bottom of said beam.

13. In a metal body for a wheeled vehicle, top beams comprising two strips at right angles to each other and secured together, a third strip uniting the free ends of the first two and forming therewith a box section, door pillar members secured to the bottom of said beams, said beams having outwardly extending projections formed by the mating and overlapping edges on the members composing said beams, and a metal roof over the beams and secured thereto by turning or crimping the roof edge over the projections on the beams.

14. In a metal body for a wheeled vehicle, an underframe, means to secure the frame directly to the axles of the vehicle, cowl braces secured to the frame at the sides thereof, a toe board secured at its lateral edges to the inside of the cowl braces and at its bottom to a cross member of the frame, a fuel tank secured beneath the toe board, and an insulating sheet between the toe board and the tank.

15. In a metal body for a wheeled vehicle, an underframe, means to attach the underframe directly to the axles of the vehicle, a skeleton frame mounted on the underframe, said frame terminating substantially at the rear axle of the vehicle, an outer shell and wheel housing members over the skeleton frame and extending rearwardly beyond the rear axle and the end of the frame, reinforcing channels inside the wheel housing members at the bottom thereof to reinforce the wheel housing members, said channels secured to the wheel housing members and extending to the frame, and a transverse plate in front of the rear axle and bracing the body between the sides and forming a support for the back of the rear seat.

16. In a metal automobile body having a windshield opening, a metal roof, a header completely inside the roof and concealed thereby and over the windshield opening, said header including a box-sectioned member secured to the edge of the roof and spaced from the roof for the greater portion of the width of the header.

17. In a metal automobile body having a windshield opening, a metal roof, a header completely inside the roof and over the windshield opening, said header including a box-sectioned member, a metal windshield glass channel secured to the edge of the roof over the opening, said header secured to the channel but spaced from the roof.

18. In a metal automobile body having a windshield opening, a metal roof, a header completely inside the roof and over the windshield opening, said header including a box-sectioned member, a windshield glass channel secured to the edge of the roof over the opening, said header secured to the channel but spaced from the roof, said header including a trim strip inside the vehicle secured to the box-sectioned member and to the channel and concealing the joint therebetween.

19. In a metal automobile body having a door opening and a roof, a box-sectioned beam at the junction of the roof and the door opening comprising three longitudinally extending members secured together, means to join the edge of the roof to the box-sectioned beam, and a channel member secured to the beam on the underside thereof to form therewith a second box section.

20. In a metal automobile body having a door opening, an upright door pillar comprising a substantially L-shaped strip having one arm of the L in the plane of the edge of the door opening and the other arm extending away from the opening at the inside of the vehicle, a channel member secured over the L-shaped member and secured at the edges of the channel to the L-shaped strip to form a box-sectioned construction therewith, and an outer body shell secured to the post.

21. In a metal automobile body having a door opening, an upright door pillar comprising a substantially L-shaped strip having one arm of the L in the plane of the edge of the door opening and the other arm extending away from the opening at the inside of the vehicle, a channel member secured over the L-shaped member and secured at the edges of the channel to the L-shaped strip to form a box-sectioned construction therewith, a window frame secured to the upper portion of said pillar, and an outer body shell secured to the post and window frame.

22. In a metal automobile body, an outer shell, an inner wheel housing member at the rear of the vehicle, an outer wheel housing member at the rear of the vehicle and complemental to the inner wheel housing member, said wheel housing members and said shell having overlapping flanges by which they are secured together, and a longitudinal channel member secured at the bottom edge of the inner wheel housing member and forming a box-sectioned construction therewith.

23. In a metal automobile body having a rear deck having a window opening therein, a channel secured by one of its flanges to the deck at the edge of the window opening, a window supporting strip secured in the channel at the other flange thereof, a window supported on the strip, and a strip of rubber in the channel and between the window and the deck edge removably to hold the window in the opening.

24. In a metal automobile body having a rear deck and a window opening therein, a frame around the window opening comprising a channel member secured by one of its flanges to the edge of the opening, a window supporting member secured to the other flange of the channel, and an interior trim or finishing strip having a flange secured to the window supporting member.

25. In a metal body for an automotive vehicle having a door opening, a sill construction comprising a channel iron extending longitudinally of the vehicle, a second channel iron nested in the first channel iron and extending longitudinally of the vehicle, said channels having their webs spaced from each other to form a box section construction and being secured together at their flanges, said channels extending in the same direction, and an outer body shell secured to said sills, said shell forming a threshold strip at the door opening and being secured to the bottom and the top of the sill and having a shoulder portion forming with the sill a floor board support.

26. In a door post construction for a metal body of an automotive vehicle having a windshield, a channel member extending the full height of the door and facing forwardly of the vehicle and having outturned flanges at the channel edge, a flat strip secured over the open side of the channel and attached to the flanges to form a hollow pillar, a second strip attached to the first-named strip at one side and extending for the length of the side of the windshield, a glass channel secured between the two strips at the other sides, and an outer shell over the post.

27. In a body for a wheeled vehicle, an underframe comprising two spaced longitudinal members, each member comprising two nested channels with the channels facing in the same direction and being secured to each other at their overlapping flanges to form a box section, spaced transverse members secured to both longitudinal members, the channels of each longitudinal diverging at one end of the frame, the outermost of said diverging channels being inwardly bent to enable the turning of the steering wheels.

28. In a body for a wheeled vehicle, an underframe comprising two spaced longitudinal members, each member comprising two nested channels with the channels facing in the same direction and being secured to each other at their overlapping flanges to form a box section, spaced transverse members secured to both longitudinal members, the channels of each longitudinal diverging at one end of the frame, the outermost of said diverging channels being inwardly bent to enable the turning of the steering wheels, and means at the ends of the longitudinals to enable an axle to be secured thereto.

ERIC OLLE SCHJOLIN.